UNITED STATES PATENT OFFICE.

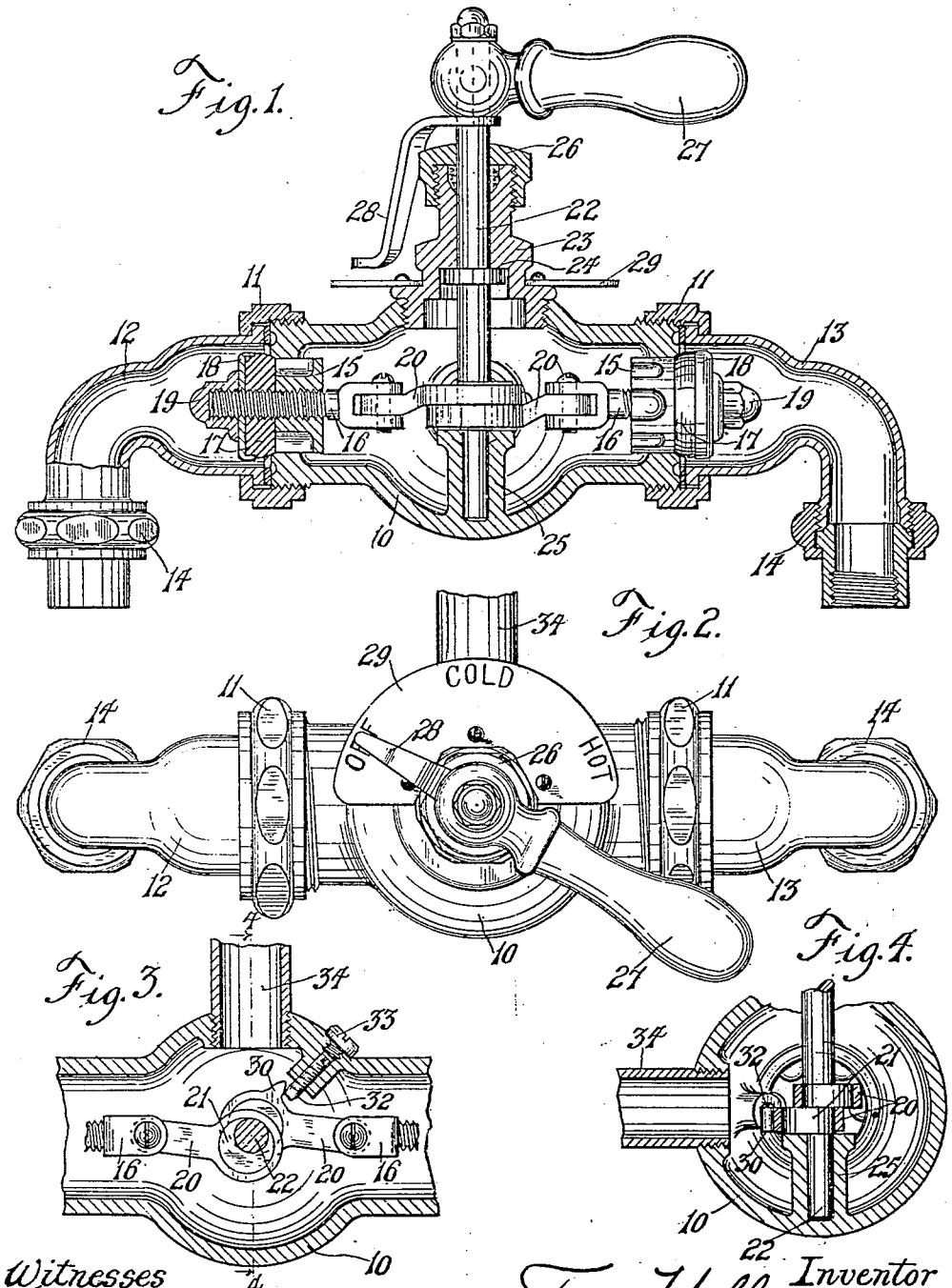

FRED HOFFMANN, OF MILWAUKEE, WISCONSIN, ASSIGNOR TO HOFFMANN & BILLINGS MANUFACTURING COMPANY, OF MILWAUKEE, WISCONSIN, A CORPORATION OF WISCONSIN.

NON-SCALDING VALVE.

982,498. Specification of Letters Patent. Patented Jan. 24, 1911.

Application filed June 5, 1909. Serial No. 500,376.

*To all whom it may concern:*

Be it known that I, FRED HOFFMANN, residing in Milwaukee, in the county of Milwaukee and State of Wisconsin, have invented new and useful Improvements in Non-Scalding Valves, of which the following is a description, reference being had to the accompanying drawings, which are a part of this specification.

This invention has for its object to provide a mixing valve for showers and the like which will be provided with an adjustable stop for limiting the degree of opening of the valve to a position where the proportion of hot water to the cold water admitted will be the maximum desired and at the same time will be such that there will be no danger of scalding.

Another object of the invention is to provide for operating the hot and cold water supply valves by means of eccentrics on the stem of the regulating handle, the valves being so arranged that a free flow of cold water is first effected and then an increasing flow of hot water with a reduction in the flow of cold water so as to raise the temperature of the mixture flowing to the shower.

Another object of this invention is to provide for the adjustment of the hot and cold water supply valves to compensate for wear.

With the above and other objects in view, the invention consists in the non-scalding valve herein claimed, its parts and combinations of parts and all equivalents.

Referring to the accompanying drawings in which like characters of reference indicate the same parts in the different views: Figure 1 is a central sectional view of a non-scalding valve constructed in accordance with this invention; Fig. 2 is a front elevation thereof; Fig. 3 is a sectional view through the casing showing the adjustable stop for limiting the throw of the valves; and, Fig. 4 is a sectional view thereof on the plane of line 4—4 of Fig. 3.

In these drawings 10 indicates a valve casing to the ends of which unions 11 connect an elbow coupling 12 of a cold water supply pipe and an elbow coupling 13 of a hot water supply pipe, each of said couplings having a union 14 for connection with said supply pipes, not shown. The ends of the valve casing 10 form valve seats for the respective cold water and hot water supply valves which comprise recessed valve members 15 threaded on valve stems 16 with rubber gaskets 17 having metal backings 18 also mounted on the valve stem and held tightly against said valve members by means of cap nuts 19 threaded on the ends of the valve stems. The valves are of the same construction, but the valve member 15 of the cold water supply valve has its recess open at the end next to the rubber gasket 17, while the valve member 15 of the hot water supply valve has its recess open at the inner end of the valve and its plane disk-like unrecessed portion against the rubber gasket 17.

The inner ends of the valve stems 16 are forked to form pivotal connections with eccentric straps 20 mounted on oppositely positioned eccentrics 21 on a regulator stem 22 which passes through a sleeve 23 threaded in the valve casing 10, said regulator stem 22 being provided with a shoulder 24 to engage the sleeve 23 and prevent end play and also having its inner end seated in a bearing stud 25 within the valve casing.

There is a gland cap 26 threaded on the end of sleeve 23 to prevent leakage around the regulator stem and the projecting end of said regulator stem is provided with a handle 27 by means of which it may be turned and an indicator finger 28 indicating the position of the valve on a marked dial 29 on the valve casing.

One of the eccentric straps 20 is provided with a projecting lug 30 to be engaged by an adjustable set screw 32 which is threaded through the wall of the valve casing to limit the degree of opening of the valves and a screw plug 33 is threaded in the opening for the set screw 32. The usual discharge pipe 34 leads upwardly from the valve casing to convey the water to the shower.

In operation both valves are tightly closed with their rubber gaskets 17 bearing firmly on the valve seats when the regulator handle 27 is in the position in which its indicator finger 28 stands in front of the word "Off" on the dial 29. When the regulator handle is turned from this position the eccentrics 21 force both of the valves to move outwardly, but by reason of the different positions of the valve members 15 the cold water supply valve admits the cold water as soon as its rubber gasket 17 is moved off of the valve seat while the hot water supply valve does not admit the hot water until the recesses of its valve member 15 are brought into communication with the valve chamber by passing the valve seat, for the said valve members 15 have a comparatively close fit in the ends of the valve casing 10. It then follows that during the first portion of the movement of the regulator handle 27 cold water only is admitted to the valve casing in increasing volume and until the word "Cold" on the dial 29 is reached by the indicator finger 28. A further movement of the regulator handle 27 reduces the inflow of cold water by the approach of the unrecessed end of valve member 15 of the cold water supply valve to the end of the valve casing, while the hot water is admitted through the recesses in the valve member 15 of the hot water supply valve and increases its volume of flow with the continuing movement of the regulator handle until the movement is stopped by the engagement of lug 30 with the adjusting screw 32, at which point a maximum flow of hot water is produced that will not be scalding in its effect. When the non-scalding valve is installed the position for the adjusting screw 32 may be determined by test and in subsequent use the regulator handle may be thrown until stopped by the set screw without danger of admitting water at a scalding temperature. Cold water or water of any intermediate temperature may be caused to flow through the shower by the proper adjustment of the regulator handle.

Should the rubber gaskets 17 become worn so as to not properly close the valves against leakage when the throw of the eccentrics 21 is extreme, either or both of the supply valves may be tightened by adjusting the valve members 15 and the other valve parts on the valve stems 16 by turning them on the screw threads thereof, and the parts may be clamped in their new adjustment by tightening the cap nuts 19.

By reason of the double union elbow connections the device may be connected up with supply pipes from below or from above or from the back and in any connection it may be quickly and easily disconnected for making repairs without disturbing the supply pipes for by uncoupling both unions the elbow connections may be removed to give access to the valves.

What I claim as my invention is—

1. A non-scalding valve, comprising a valve casing, hot and cold water supply valves controlling inlets thereto, a regulator handle having a stem mounted in the valve casing, eccentrics carried by the stem, and eccentric straps surrounding the eccentrics and having pivotal connection with the valves.

2. A non-scalding valve, comprising a valve casing, hot and cold water supply valves controlling inlets thereto, a regulator handle having a stem rotatably mounted in the valve casing, eccentrics carried by the stem, and eccentric straps surrounding the eccentrics and connected with the valves, said valves being adjustable with relation to the eccentrics.

3. A non-scalding valve, comprising a valve casing, hot and cold water supply valves controlling inlets thereto, a regulator handle having a stem rotatably mounted in the valve casing, eccentrics carried by the stem, and eccentric straps surrounding the eccentrics and connected to the valves, said valves being threaded on their connections with the eccentric straps whereby they may be adjusted.

4. A non-scalding valve, comprising a valve casing having valve seats at its opposite ends, hot and cold water supply valves for said valve seats comprising recessed valve members slidably mounted within the valve seats and having rubber gaskets for fitting on the valve seats, the recess in one of the valve members extending to the inner end of the valve and the recess in the other valve member being spaced from the inner end of the valve, and a regulator handle mounted on the valve casing and having operative and pivotal connection with said valves.

5. A non-scalding valve, comprising a valve casing having valve seats at its opposite ends, hot and cold water supply valves for said valve seats comprising recessed valve members slidably mounted within the valve seats and having rubber gaskets for fitting on the valve seats, the recess in one of the valve members extending to the inner end of the valve and the recess in the other valve member being spaced from the inner end of the valve, valve stems on which the valves are threaded, a regulator handle having a stem mounted in the valve casing, eccentrics on the regulator stem, and eccentric straps around the eccentrics having pivotal connection with the valve stems.

6. A non-scalding valve, comprising a valve casing having valve seats at its opposite ends, hot and cold water supply valves for said valve seats comprising recessed valve members slidably mounted within the valve seats and having rubber gaskets for fitting on the valve seats, the recess in one of the valve members extending to the inner end of the valve and the recess in the other valve member being spaced from the inner end of the valve, valve stems on which the valves are threaded, and cap nuts for clamping the valve parts in their adjustment on the valve stems, a regulator handle having a stem mounted in the valve casing, eccentrics on the regulator stem, eccentric straps around the eccentrics having connection with the valve stems, a marked dial on the valve casing, and an indicator finger carried by the regulator handle to show the position of the valves on the dial.

7. A non-scalding valve, comprising a valve casing, hot and cold water supply valves controlling inlets thereto, a regulator handle having a stem mounted in the valve casing, eccentrics carried by the stem, eccentric straps surrounding the eccentrics and connected with the valves, and an adjustable set screw threaded in the casing and standing in the path of one of the eccentrics to limit the movement thereof and form a stop to limit the temperature of the water admitted by the valves.

8. A non-scalding valve, comprising a valve casing, hot and cold water supply valves controlling inlets thereto, a regulator handle having a stem mounted in the valve casing, eccentrics carried by the stem, eccentric straps surrounding the eccentrics and connected with the valves, a lug on one of the eccentric straps, and a set screw threaded through the valve casing to engage the lug and limit the degree of opening of the valves.

9. A non-scalding valve, comprising a valve casing having valve seats at its opposite ends, hot and cold water supply valves for said valve seats comprising recessed valve members slidably mounted within the valve seats and having rubber gaskets for fitting on the valve seats, the recess in one of the valve members extending to the inner end of the valve and the recess in the other valve member being spaced from the inner end of the valve, valve stems on which the valves are threaded, cap nuts for clamping the valve parts in their adjustment on the valve stems, a regulator handle having a stem mounted in the valve casing, eccentrics on the regulator stem, eccentric straps around the eccentrics having connection with the valve stems, and elbows having union connections with the ends of the valve casing and union connections for the service pipes.

In testimony whereof, I affix my signature, in presence of two witnesses.

FRED HOFFMANN.

Witnesses:
R. S. C. CALDWELL,
ALMA A. KLUG.